Aug. 18, 1959    W. RAUCH    2,900,583
RESONANCE RELAY
Filed April 10, 1957
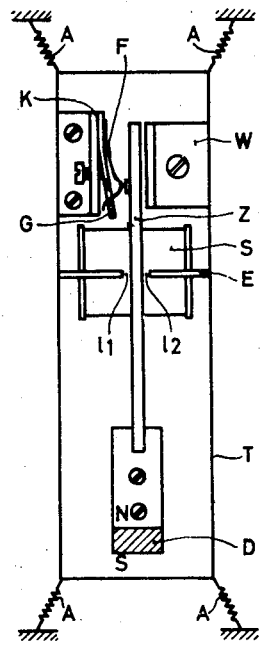
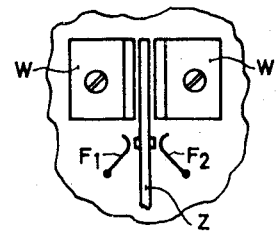
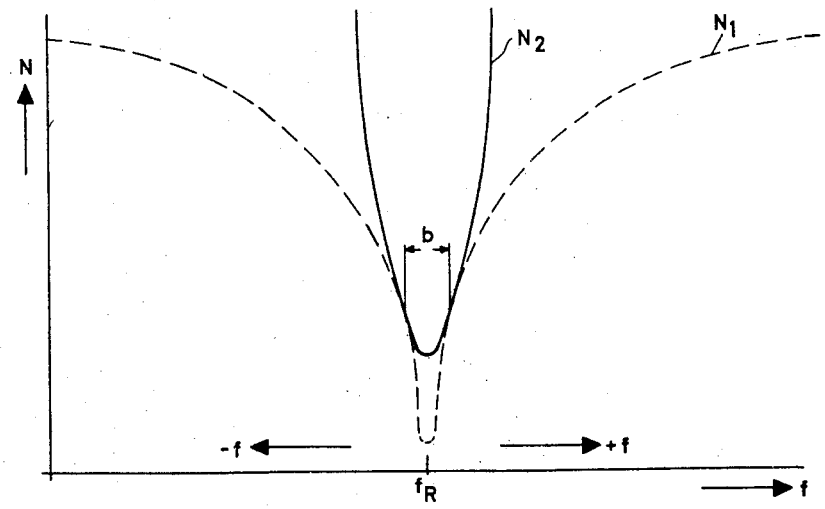
Inventor.
Walter Rauch.

United States Patent Office 2,900,583
Patented Aug. 18, 1959

2,900,583

RESONANCE RELAY

Walter Rauch, Munich, Germany, assignor to Siemens & Halske Aktiengesellschaft, Berlin and Munich, a corporation of Germany Application April 10, 1957, Serial No. 651,912

Claims priority, application Germany April 20, 1956

5 Claims. (Cl. 317—182)

This invention is concerned with a resonance relay comprising an electromagnet system having an iron core of relatively small cross-section to provide for relatively low saturation inductance, so as to impart to the relay the characteristics of a band pass filter.

For various purposes of control engineering, there are required relays which are adapted to differentiate signals of different frequencies and to respond only to a given frequency. Known embodiments of such resonance relays provide a resilient reed or a tuning fork which is caused to oscillate responsive to energization of a winding of an electromagnet system when the frequency of the energizing current corresponds to the natural frequency of the reed or tuning fork. For the further switching operations, there are provided one or more spring contacts which are opened and closed by the movement of the vibrating element in synchronism with the operating frequency of the resonance relay. Due to the effect of temperature, aging or possible error in tuning, the response frequency of a resonance relay should not lie precisely at a given value but should show a certain minimum band width under given operating conditions. Due to the generally pointed shape of the resonance curve, response however differs greatly within the permitted bandwidth. At frequencies which correspond to the resonance peaks, there is thus present a high sensitivity which may cause the relay to respond even in case of disturbances, particularly by combination tones.

In order to avoid this danger, it is advantageous for the frequency curve of the resonance relay, while having sufficient selectivity with respect to an adjacent channel, not to exhibit any pronounced resonance peak.

The invention proposes a resonance relay comprising a single resonance spring which is polarized by a permanent magnet and energized by an electromagnet. The selectivity with respect to an adjacent channel is in accordance with the invention obtained by the use of an electromagnet system having an extensively closed iron core and magnetic conductors of high permeability and low saturation inductance, the response curve of the relay being approximated to that of a band-pass filter. In order to avoid saturation of the iron circuit in normal operation, it is advisable that the operating energizing power for resonance is only slightly above the response power of the vibrating system. In order to avoid a pointed shape of the response curve at resonance, it is advantageous to provide a damping device which cooperates with the resonance spring, to achieve in this way an increase of the response power in the range of the resonance frequency. The damping is preferably obtained by air damping at the freely vibrating end of the resonance spring. As a further feature of the invention, for the purpose of acoustic damping, the resonance spring, together with its drive system may be arranged on a support and this support fastened to a resilient suspension device of such dimensions that its natural frequency is only a fraction of the frequency of the resonance spring.

The foregoing and other features of the invention will be brought out in the following description with reference to the accompanying drawing in which Fig. 1 is a schematic showing of the resonance relay;

Fig. 1a shows a different embodiment of the damping device as well as of the contact means; and Fig. 2 is a diagram serving to explain the invention.

A vibrating reed Z is disposed, together with a permanent magnet D, on a common support T. The reed Z thereby conducts the permanent flux of the permanent magnet D to the air gaps 11 and 12. The control flux produced by the energizing coil S is superimposed on the permanent flux and effects the excitation of the reed Z when the frequency of the control flux corresponds to the natural frequency of the reed. The iron core E, which is of stirrup shape, is made of material of high permeability and has a relatively small cross-section. It is as a result possible to obtain saturation of the iron core E at an energizing power which is only slightly above the operating energizing power. Before the occurrence of saturation, the magnetic reluctance of the energizing circuit is however small. For the operation of the vibrating reed, this means, that outside of a predetermined band width, the required energizing power must be substantially higher than without saturated iron core.

In order to avoid an undesired resonance peak in the frequency curve, an air damping formed by an angle plate W is provided at the freely vibrating end of the reed Z. The angle plate W is so arranged that the reed Z just fails to touch it in its swing. Due to the air damping, the response curve is substantially flatter in the range of resonance frequency so that a certain approximation to the curve shape of a band-pass filter is obtained. If the damping effect is to be increased still further, two angle plates W may be provided as shown in Fig. 1a between which the reed Z freely swings.

A comparison of the response curve between a resonance relay of customary type and a relay in accordance with the present invention is shown in Fig. 2. The dotted line response curve N1 shows the course of the response energizing power N in known resonance relays and shows the sharp resonance peak at the frequency $f_R$. Upon a change of the frequency in the direction $+f$ or $-f$, the required response power then increases rapidly. As compared with this, response curve N2, the course of which was effected by the saturation of the iron core in accordance with the invention and damping acting on the vibrating reed Z, has a substantially flatter course within the assumed minimum band width $b$ and, in view of the saturation which sets in, rises considerably more steeply since the energizing force remains practically constant despite the increase in the energizing power. The energizing circuit is thereby so dimensioned that saturation sets in as soon as the energizing power exceeds the response value even slightly.

The actuation of the contact device K, by the vibrating reed Z, is effected through the medium of spring F which is clamped at one end and pretensioned against stop G. When the reed Z swings out so as to make contact, the spring F can move away from the stop G so that the swinging is not interrupted.

Instead of a contact device arranged only on one side, two springs F1 and F2 may be provided symmetrically to the vibrating reed Z as shown diagrammatically in Fig. 1a. The time of the giving of impulses for the succeeding switching means is thus increased since the circuit is closed upon each half vibration.

The support T carrying the vibrating system is suspended with respect to a fixed frame by means of resilient suspension members A. The masses of the support T and of the suspension members A are so selected that the natural frequency is only a fraction of the operating frequency of the vibrating system.

Changes may be made within the scope and spirit of the appended claims.

I claim:

1. A resonance relay comprising a permanent magnet, a single resonance reed mounted for vibration with one end thereof anchored adjacent said permanent magnet, said permanent magnet polarizing said reed, an electromagnet for driving said reed, and an iron core for said electromagnet disposed with the free ends thereof relatively slightly spaced from said reed at a point intermediately the opposite ends of said reed, said iron core having high permeability and relatively very small cross-section to provide for relatively low saturation inductance for the purpose of imparting to said relay the characteristics of a band pass filter, a support for said resonance relay, and resilient suspension means for mounting said support so that the natural frequency of said resilient suspension means is only substantially a fraction of the operating frequency of said resonance reed.

2. A resonance relay according to claim 1, comprising an angle plate having one leg affixed to the support and the other leg laterally positioned with respect to the freely vibrating resonance reed so that the laterally positioned leg is parallel to the resonance reed and so arranged that the resonance reed fails to touch said other leg in its swing for damping the vibration of the reed.

3. A resonance relay according to claim 1, comprising damping means comprising at least one angle plate having one leg affixed to the support and the other leg thereof aligned with a portion of said resonance reed at the freely vibrating end thereof and out of contact therewith to dampen the vibration of said resonance reed by the air between said damping means and the corresponding end portion of said reed.

4. A resonance relay according to claim 1, wherein said resilient suspension means include suspension members fixedly anchored at one end and diagonally connected with each corner of said support at the other end thereof.

5. A resonance relay comprising a permanent magnet, a single resonance reed mounted for vibration with one end thereof anchored adjacent said permanent magnet, said permanent magnet polarizing said reed, an electromagnet for driving said reed, and an iron core for said electromagnet disposed with the free ends thereof relatively slightly spaced from said reed at a point intermediately the opposite ends of said reed, said iron core having high permeability and relatively very small cross-section to provide for relatively low saturation inductance for the purpose of imparting to said relay the characteristics of a band pass filter and at the same time providing for operating energizing power for resonance which is only slightly in excess of the power required for driving said reed, a support for said resonance relay, and resilient suspension means for mounting said support, the masses of said support and said resilient means adapted to permit the natural frequency thereof to be only a fraction of the operating frequency of said resonance reed.

References Cited in the file of this patent

UNITED STATES PATENTS

| | | |
|---|---|---|
| 2,391,668 | Austin | Dec. 25, 1945 |
| 2,629,033 | Dale | Feb. 17, 1953 |
| 2,691,749 | Durkee | Oct. 12, 1954 |

FOREIGN PATENTS

| | | |
|---|---|---|
| 366,967 | Italy | Jan. 12, 1939 |